United States Patent Office 3,845,088
Patented Oct. 29, 1974

3,845,088
CYCLOPENTANE OR CYCLOHEXANE SUBSTITUTED UNSATURATED HYDROCARBON ESTERS HAVING JUVENILE HORMONE ACTIVITY
John A. Findlay, 682 George St., Fredericton, New Brunswick, Canada
No Drawing. Original application Aug. 4, 1971, Ser. No. 169,126, now Patent No. 3,761,495. Divided and this application May 7, 1973, Ser. No. 357,978
Int. Cl. A01n 9/24; C07c 69/74
U.S. Cl. 260—410.9 R          2 Claims

ABSTRACT OF THE DISCLOSURE

A process is disclosed herein for the preparation of hydrocarbon acid esters of formula,

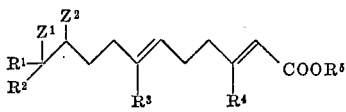

in which $R^1$ and $R^2$ are alkyl groups containing 2 to 4 carbon atoms or $R^1$ and $R^2$ together are a polymethylene group containing 4 to 5 carbon atoms forming a cyclopentane or cyclohexane ring, $R^3$, $R^4$ and $R^5$ are alkyl groups containing 1–2 carbon atoms and $Z^1$ and $Z^2$ together are a carbon-carbon double bond or an epoxide; whereby the appropriate ketone of formula $R^1R^2C=O$ is condensed with the ylid generated from either 4-oxopentyl-1-triphenylphosphonium iodide ethylene ketal or 4-oxohexyl-1-triphenylphosphonium iodide ethylene ketal, followed by acid treatment to remove the ketal, and yield the appropriate ketonic intermediate, which is treated successively with either of the preceding ylids and then acid treatment to yield a ketone of formula $$R^1R^2C=CHCH_2CH_2CR^3=CHCH_2CH_2COR^4;$$

the last said compound is then treated with the anion prepared from a dialkylcarbomethoxymethyl or a dialkylcarboethoxymethyl phosphonate to yield the hydrocarbon acid esters of the above formula in which $Z^1$ and $Z^2$ together are a carbon-carbon double bond, said last compounds are oxidized to yield the hydrocarbon acid esters of the above formula in which $Z^1$ and $Z^2$ together are an epoxide. The hydrocarbon acid esters of this invention are useful for the control of insect population and methods for their formulation and use for this purpose are given.

---

This is a division of application Ser. No. 169,126, filed Aug. 4, 1971, now U.S. Pat. 3,761,495.

In 1967, Röller et al., Angew. Chem. Internat. Edn., 6, 179 (1967), reported the elucidation of the major component of the extract of juvenile hormone from the giant silkworm moth. The structure of this component was established as methyl 10-epoxy-7-ethyl-3,11-dimethyl-2,6-tridecadienoate. This event has sparked an intensive investigation of the chemistry, biochemistry and biological properties of juvenile hormone in recent years.

Juvenile hormone appears to control egg ripening and the normal development of the sexually mature insect from the larva. In the normal life cycle of the insect, the juvenile hormone must be present at the stage of the immature larva if it is to progress through the normal stages of larval development. However, the juvenile hormone must be absent if the mature larva is to metamorphose into the sexually mature insect. Presence of the juvenile hormone at this point in the development of the insect will prevent the emergence of the sexually mature form capable of reproduction, and contact of the eggs with the juvenile hormone will prevent normal embryonic development. These facts are of great importance in the control of insect populations.

To date a variety of natural and synthetic compounds have been shown to possess juvenile hormone activity, for example; farnesol, juvabione and methyl 7,12-dichloro-3,7,12-trimethyldodec-2-enoate, see C. E. Berkoff, "The Chemistry and Biochemistry of Insect Hormones," Quarterly Reviews (The Chemical Society), 23, 372 (1969). However, many of these other compounds are not suitable for the practical control of insect population since they have, in addition, undesirable features such as low potency, complex methods of preparation, or toxic effects to other species.

It is the object of this invention to disclose a simple and efficient process for preparing hydrocarbon acid esters exhibiting potent juvenile hormone activity. These hydrocarbon acid esters possess a very low order of toxicity to species other than insects.

More specifically, this invention relates to a facile preparation of unsaturated hydrocarbon acid esters containing 18 to 25 carbon atoms which may be represented by formula I:

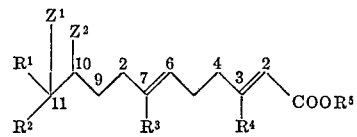

in which $R^1$ and $R^2$ represent alkyl groups containing from 2 to 4 carbon atoms or $R^1$ and $R^2$ together represent a polymethylene radical containing 4 to 5 carbon atoms which in conjunction with the carbon atom 11 to which they are bonded form a cyclopentane or cyclohexane ring, respectively; $R^3$, $R^4$ and $R^5$ represent alkyl groups containing 1 to 2 carbon atoms and $Z^1$ and $Z^2$ together represent a carbon-carbon double bond between carbon atoms 10 and 11 or a 10,11-epoxide.

Certain intermediates and products of this invention are also included in this invention.

The compounds of formula I of the process of this invention exhibit the biological activities of the juvenile hormone and are useful as means for controlling insect populations. More particularly, these compounds, when tested in standard pharmacological tests used in entomology, for example in the modified Tenebrio test described by Röller et al., in Life Sci., Vol. 4, p. 1617 (1965), exhibit the useful activity of the juvenile hormone. When administered to the test insects in the manner described by Röller et al., cited above, the compounds of this invention of formula I cause the formation of typical pupal cuticle over the area of deposition.

For purposes of controlling insect populations, the compounds of this invention of formula I may be formulated in the form of liquid sprays, in solution in suitable solvents such as lipophilic solvents, for example vegetable or mineral oils, or hydrocarbon solvents, or solvents which have both lipophilic and hydrophilic characteristics, for example, lower aliphatic ketones or polyhydric alcohols; or they may be dissolved in a lipophilic solvent such as exemplified above and may be formulated in the form of aqueous emulsions together with suitable surface-active agents such as emulsifiers and/or detergents, and other suitable excipients. They may also be formulated in the form of dusting powders together with suitable solid excipients. Such preparations may contain from 0.1 to 100 mg. of the active ingredient per liter of liquid or per kilogrram of solid preparation, and may be applied to areas or to the plants infested by the insects which are to be controlled, by means of spraying or dusting in the usual manner for controlling insect populations.

According to the process of this invention the hydrocarbon acid esters of formula I may be prepared in the following manner:

The starting materials for the process of the invention are the simple ketones of formula $R^1R^2C=O$ (II), in which $R^1$ and $R^2$ are as defined above. Most of these simple ketones are commercially available; the remaining starting materials are prepared by conventional methods. Such conventional methods for preparing ketones and aldehydes are described in textbooks on organic chemistry; for example, see P. Karrer, "Organic Chemistry," 2nd ed., Elsevier Publishing Co., Inc., New York, 1946, pp. 149–169 and V. Migrdichian, "Organic Synthesis," Vol. 1, Reinhold Publishing Corp., New York, 1957, pp. 100–129.

Condensation of the simple ketones of formula II with the ylid generated from either 4-oxopentyl-1-triphenylphosphonium iodide or 4-oxohexyl-1-triphenylphosphonium iodide, see Example 1 for preparation, followed by acid treatment, yields the ketone intermediates of formula III in which $R^1$ and $R^2$ are as defined above and $R^3$ is methyl or ethyl, respectively. The latter compounds are in turn condensed again with either of the above ylids followed by acid treatment to yield the dienone derivative of formula IV in which $R^1$, $R^2$ and $R^3$ are as described above and $R^4$ is either methyl or ethyl depending on whether the ylid from 4-oxopentyl-1-triphenylphosphonium iodide or 4 - oxohexyl - 1-triphenylphosphonium iodide is used, respectively.

The latter dienones of formula IV are then treated with the anion prepared from a dialkylcarbonethoxymethyl or a dialkylcarbethoxymethyl phosphonate containing from 1–4 carbon atoms in the alkyl groups. The latter compounds are conveniently prepared from methyl or ethyl chloroacetate and the appropriate trialkyl phosphite in which the alkyl group contains from 1–4 carbon atoms each, and the anion is prepared therefrom by means of an alkali metal alkoxide containing from 1–4 carbon atoms or an alkali metal hydride. There are obtained the hydrocarbon acid methyl, or ethyl, esters of formula I in which $R^1$, $R^2$, $R^3$ and $R^4$ are as defined above, $R^5$ is methyl or ethyl, respectively, and $Z^1$ and $Z^2$ together represent a carbon-carbon double bond between carbon atoms 10 and 11.

The latter compounds are converted to the corresponding 10,11-epoxides, the hyrocarbon acid esters of formula I in which $R^1$, $R^2$, $R^3$, $R^4$ and $R^5$ are as defined in the first instance and $Z^1$ and $Z^2$ together represent a 10,11-epoxide, by treatment with either a reagent selected from the group, N-bromo- and N-chloro-succinimide and N-bromo- and N-chloroacetamide followed by treatment with an alkali metal alkoxide containing 1–4 carbon atoms, or by treatment with an organic peracid.

It will be apparent to those skilled in the art that the compounds of this invention are capable of existing in many isomeric forms. This invention is not concerned with separating such isomers, although means for such separations are obvious to those skilled in the art.

The principal advantage of the process of this invention is the fact that it proceeds from commercially available starting materials to the desired final products in good yields and via a pathway involving relatively few steps. In view of the great importance of compounds possessing juvenile hormone activity as means for controlling insect populations, a practically useful process of preparation of such compounds, as described more fully in the following sections, is especially advantageous.

First, 4 - oxopentyl - 1 - triphenylphosphonium iodide ethylene ketal is prepared by treating commercially available 5 - chloro - 2-pentanone in a solvent with a molar excess of sodium iodide, to obtain the corresponding 5-iodo-2-pentanone. Preferred conditions for this reaction include the use of three equivalents of sodium iodide and of acetone as the solvent, and refluxing for 0.5 to 2 hours.

5-Iodo-2-pentanone thus obtained is ketalized by treatment in a water-immiscible solvent with a molar excess of ethylene glycol in the presence of small amounts of an acid catalyst, removing water from the reaction mixture as it is being formed. Preferred reaction conditions include the use of three equivalents of ethylene glycol, 0.1 equivalent of p-toluenesulfonic acid, benzene as the solvent, and a water-separating device as part of the equipment. Refluxing the mixture for periods of time of from 8 to 24 hours yields 5-iodo-2-pentanone ethylene ketal.

Said last-named compound is treated with a molar excess of triphenylphosphine at a temperature within the range of from 50 to 150° C. in an inert solvent to yield 4 - oxopentyl - 1 - triphenylphosphonium iodide ethylene ketal. Preferred reaction conditions include the use of 1.1 equivalents of triphenylphosphine and of benzene as the solvent, and carrying out the reaction at the reflux temperature of the mixture, whereupon the desired compound crystallizes from the reaction mixture in a sufficiently pure state for immediate use.

In a similar manner, 4-oxohexyl-1-triphenylphosphonium iodide ethylene ketal is prepared except that 6-chloro-3-hexanone is used instead of 5-chloro-2-pentanone.

The 4-oxopentyl-1-triphenylphosphonium iodide ethylene ketal or 4-oxohexyl-1-triphenylphosphonium iodide ethylene ketal, thus prepared, may be converted to their coresponding ylids by treatment with an alkali metal alkoxide containing from 1 to 5 carbon atoms or an alkali metal hydride in a common solvent. Subsequent condensation of the appropriate ylid with a ketone of formula II described above, yields the ketone intermediates of formula III, described above, after acid treatment. I have found it convenient to perfom this condensation by preparing the ylid *in situ* in dimethylsulfoxide solution by first adding approximately one molar equivalent of sodium hydride to an excess of the solvent, dimethylsulfoxide, to form the sodium methylsulfinyl carbanion. Subsequent addition of a solution of 4-oxopentyl-1-triphenylphosphonium iodide ethylene ketal or 4-oxohexyl-1-triphenylphosphonium iodide ethylene ketal in dimethylsulfoxide, under nitrogen at a temperature within the range of from 15–35° C. and stirring for a period of time of from 5–30 minutes yields the desired ylid. To this solution of the ylid thus obtained there are added 0.5–1.2 molar equivalents, peferably 0.1 molar equivalents, of the appropriate ketone of formula II, and the mixture is stirred at temperatures of from 20° C. to the boiling point of the mixture for periods of time of from 15 minutes to 24 hours. Dilution with water, extractions with a water-immiscible solvent, preferably n-pentane, and evaporation of the solvent yields a residue, the ethylene ketal of the ketone intermediate of formula III. The latter compound is preferably not isolated, but the residue obtained as described above is treated in an inert solvent, preferably tetrahydrofuran, with an acid, preferably dilute aqueous hydrochloric acid. In this manner the ketal group is removed and there is obtained the ketone intermediate of formula III.

The next step of this process, the conversion of the ketone intermediate of formula III to the dienone derivative of formula IV, may be accomplished in the same manner as the above described conversion of the ketones of formula II to the ketone intermediates of formula III except that an equivalent amount of the ketone intermediate of formula II is used instead of the ketone of formula II. Furthermore, I have found that the above preferred conditions relating to the previous step of the process II→III apply equally well to this present step, III→IV, including the conditions for the acid treatment to remove the ketal group from the resulting ethylene ketal derivative.

The dienone derivative of formula IV, thus obtained, is treated with the anion prepared from a dialkylcarbomethoxymethyl or a dialkylcarbethoxymethyl phosphonate, preferably dimethylcarbomethoxymethyl phosphonate, obtained from methyl chloroacetate and trimethyl phosphite according to the method described by P. C. Crofts in Quart. Rev. Chem. Soc., *12*, 341 (1958) by the action of approximately an equivalent amount of an alkali metal hydride in an inert solvent or by the action of an approximately equivalent amount of an appropriate alkali metal alkoxide containing from 1 to 4 carbon atoms in an inert solvent. This anion formation is performed preferably by mixing equivalent molar amounts of the appropriate dialkylcarbomethoxymethyl or dialkylcarbethoxymethyl phosphonate, preferably dimethylcarbomethoxymethyl phosphonate, with sodium hydride in benzene, stirring the reaction mixture at a temperature of from 10° C. to the boiling point of the mixture until the sodium hydride dissolves in the reaction mixture. The alkyl groups in the above compounds contain from 1–4 carbon atoms.

Addition of the appropriate dienone derivative of formula IV, described above, to the prepared solution of one of the above anions yields the corresponding methyl or ethyl ester of formula I in which $R^1$, $R^2$, $R^3$, $R^4$ are as defined in the first instance, $R^5$ is methyl or ethyl respectively and $Z^1$ and $Z^2$ together represent a carbon-carbon double bond between carbon atoms 10 and 11.

Preferred conditions in the above reaction include agitating the reaction mixture at temperatures of from 10° C. to the boiling point of the mixture for periods of time of from 8 hours to 6 days, dilution with water, extraction with a water-immiscible solvent, and purification by chromatography, preferably on silica gel.

Treatment of the latter compounds of formula I with 0.7 to 1.3 molar equivalents of N-bromo- or N-chloro-succinimide or N-bromo- or N-chloroacetamide in solution in a mixture of 1.5 to 4 parts of dimethoxyethane and 1 part of water, followed by treatment of the reaction product with a molar excess of an alkali metal alkoxide containing 1–4 carbon atoms, all reactions being carried out at temperatures of from −10° C. to 10° C., for 20 to 120 minutes in a manner similar to that described by Corey et al., J. Am. Chem. Soc., *90*, 5618 (1968), afford the hydrocarbon acid esters of formula I in which $R^1$, $R^2$, $R^3$, $R^4$ and $R^5$ are as defined in the first instance and $Z^1$ and $Z^2$ together represent a 10,11-epoxide. Preferred reaction conditions include the use of 1.1 equivalents of N-bromosuccinimide, of a 3:2 mixture of dimethoxyethane and water as solvent, of 1.1 equivalents of sodium methoxide, of reaction temperatures close to 0° C., and of reaction times of 30 to 60 minutes. The desired hydrocarbon acid esters of formula I thus obtained may be purified, preferably by chromatography on silica gel or on alumina.

Alternatively, the above compounds of formula I in which $Z^1$ and $Z^2$ are a carbon-carbon double bond may be treated with at least one molar equivalent of an organic peracid in an inert solvent at temperatures of from −20° C. to 20° C., from two hours to two days in a manner similar to that described by K. H. Dahm et al., J. Am. Chem. Soc., *89*, 5292 (1967). In this manner the hydrocarbon acid esters of formula I, in which $R^1$, $R^2$, $R^3$, $R^4$ and $R^5$ are as defined in the first instance and $Z^1$ and $Z^2$ together represent a 10,11-epoxide, are also obtained. Preferred conditions include the use of 1.1 equivalents of perbenzoic or *m*-chloroperbenzoic acid, ether as solvent, a reaction temperature of 0° C. and a reaction time of 16 hours. Purification of the desired hydrocarbon acids esters may be effected as described above.

The following formulae, in which $R^1$, $R^2$, $R^3$, $R^4$, $R^5$, $Z^1$ and $Z^2$ are as defined in the first instance, and Examples are illustrative of this invention.

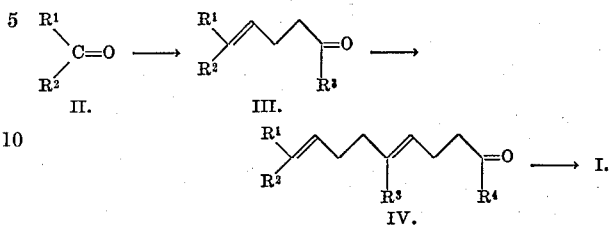

EXAMPLE 1

1. 4-oxopentyl-1-triphenylphosphonium iodide ethylene ketal

A. 5-Iodo-2-pentanone: Commercial 5-chloro-2-pentanone (4.82 g., 0.04 mole) and sodium iodide (18.0 g., 0.12 mole) are dissolved in 100 ml. acetone and refluxed for one hour. The acetone is evaporated, the residue dissolved in water and extracted twice with ether. The combined ether phases are washed with 0.1 N sodium thiosulfate to remove free iodine, dried over anhydrous magnesium sulfate, filtered, and evaporated, to yield the title compound as a light yellow liquid,

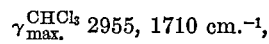

$\tau^{CCDl_3}$ 6.81, 7.44, 7.87, 8.00. A sample is purified by distillation to b.p. 94° C./14 mm. Hg, but partial decomposition occurs during distillation and the bulk of the material is used without purification in the subsequent step.

In one such experiment the yield obtained was 58 per cent of theory.

B. 5-Iodo-2-pentanone Ethylene Ketal: 5-Iodo-2-pentanone (68 g. 0.32 mole), obtained as described above, *p*-toluenesulfonic acid (6.1 g., 0.032 mole), and ethylene glycol (51.8 g., 0.96 mole) are refluxed together with 800 ml. benzene in an apparatus equipped with a water separator for 24 hours. The reaction mixture is cooled, diluted with 1250 ml. 5% sodium bicarbonate solution, and extracted twice with 625 ml. portions of ether. The combined ether extracts are washed with 400 ml. 0.1N sodium thiosulfate to remove excess iodine, dried over sodium sulfate, filtered, evaporated, and the residue is distilled under reduced pressure, to yield the title compound with b.p. 76° C./0.05 mm. Hg,

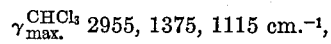

$\tau^{CCDl_3}$ 6.06, 6.75, 8.21, 8.69.

C. 4-Oxopentyl-1-triphenylphosphonium Iodide Ethylene Ketal: Triphenylphosphine (11.2 g., 0.0429 mole) is dissolved in 35 ml. benzene and 10 ml. benzene are distilled off to remove traces of water. 5-Iodo-2-pentanone ethylene ketal (10.0 g., 0.039 mole), obtained as described above, is added and the mixture is refluxed for one hour. The title compound crystallizes from the reaction mixture, is filtered off and washed with dry ether, m.p. 210–215° C.,

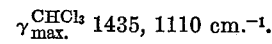

2. 4-oxohexyl-1-triphenylphosphonium iodide ethylene ketal

Following the procedures A, B and C of Example 1, part 1, but using an equivalent amount of 6-chloro-3-hexanone, described by B. Helferich and V. Böllert, Chem. Ber., *94*, 505 (1961), instead of 5-chloro-2-pentanone, 4-oxohexyl-1-triphenylphosphonium iodide ethylene ketal may be obtained.

EXAMPLE 2

5-cyclohexylidenepentan-2-one (III: $R^1$ and $R^2$ together=—$(CH_2)_5$— and $R_3=CH_3$)

Sodium hydride (0.49 g. of a 57% mineral oil dispersion, 11.5 meq.) is washed with pentane (3 × 9 ml.), then dried with a stream of dry nitrogen. Dimethylsulfoxide (9 ml.) is added and the resulting suspension heated at 75° under dry nitrogen for ½ hour with stirring; completion of the reaction is detected by the cessation of hydrogen evolution. After cooling to 20° C., 4-oxopentyl - 1 - triphenylphosphonium iodide ethylene ketal (5.18 g., 10 meq.), prepared as described in Example 1, is added followed by 15 ml. of dimethylsulfoxide and the mixture stirred for 10 minutes, forming the corresponding ylid of the phosphonium salt. Then cyclohexanone (0.98 g., 10 meq.) in 9 ml. of dimethylsulfoxide is added over a period of 10 minutes and the mixture stirred for 1–1½ hours at 60–70° C. After cooling to 20° C., the reaction mixture is poured into 200 ml. of water and extracted with pentane (100+50+50+50 ml.). The pentane extract is washed with water (3 × 50 ml.), dried over magnesium sulfate and evaporated at room temperature under vacuum, yielding an oil. The oil is dissolved in tetrahydrofuran (THF) (20 ml.) and treated with aqueous hydrochloric acid (20 ml. of 1N soln.) overnight (14 hr.) at room temperature with stirring. After evaporation of the THF under reduced pressure at room temperature, the aqueous mixture is extracted with ether (20+15+15 ml.), and the ether extract washed with water to neutrality, dried over magnesium sulfate and evaporated at room temperature under reduced pressure to yield the title compound, $$\gamma^{CS_2}_{max.} \ 1719 \ cm.^{-1},$$

$\tau^{CDCl_3}$ 4.97 (broad unresolved triplet, 1H), 7.3–8.2 (complex absorption, 8H), 7.87 (singlet, 3H), 8.3–8.7 (broad band, 6H), and the mass spectrum displayed a molecular ion at M/e 166. This product is suitable for the next step, see Example 6. In one experiment performed according to this procedure the yield was 80% based on cyclohexanone.

EXAMPLE 3

6-ethyl-5-octen-2-one (III; $R^1$ and $R^2=C_2H_5$ and $R^3=CH_3$)

By following the procedure of Example 2 but using an equivalent amount of 3-pentanone instead of cyclohexanone, there is obtained the title compound; $\tau^{CDCl_3}$ 4.97 (broad unresolved triplet, 1H), 7.2–8.3 (complex absorption, 8H), 7.85 (singlet, 3H), 9.03 (triplet, 6H, J=11 c.p.s.); mass spectrum displayed a molecular ion at M/e 154.

EXAMPLE 4

In the same manner as described for Example 2, but using an equivalent amount of cyclopentanone, 3-hexanone, 3-heptanone, 4-heptanone, 4-octanone or 5-nonanone, there may be obtained, 5-cyclopentylidenepentan-2-one, 6 - ethyl - 5 - nonen - 2 - one, 6 - ethyl - 5 - decen-2 - one, 6 - propyl - 5 - nonen - 2 - one, 6 - propyl - 5 - decen - 2 - one and 6 - butyl - 5 - decen - 2 - one, respectively.

EXAMPLE 5

In the same manner as described for Example 2, but using an equivalent amount of 4-oxohexyl - 1 - triphenylphosphonium iodide ethylene ketal instead of 4-oxopentyl - 1 - triphenylphosphonium iodide and one of the appropriate ketones of formula II, cyclohexanone, cyclopentanone, 3-pentanone, 3-hexanone, 3-heptanone, 4-heptanone, 4-octanone or 5-nonanone, there may be obtained the ketone intermediates of formula III, 6-cyclohexylidenehexan - 3 - one, 6-cyclopentylidenehexan - 3 - one, 7-ethyl - 6 - nonen - 3 - one, 7-ethyl - 6 - decen - 3 - one, 7-ethyl - 6 - undecen - 3 one, 7-propyl - 6 - decen - 3 - one, 7-propyl - 6 - undecen - 3 - one and 7-butyl - 6 - undecen-3-one, respectively.

EXAMPLE 6

9-cyclohexylidene-6-methyl-5-nonen-2-one (IV; $R^1$ and $R^2$ together=$(CH_2)_5$, $R_3$ and $R_4$ each=$CH_3$)

The corresponding ylid of 4-oxopentyl - 1 - triphenylphosphonium iodide ethylene ketal is prepared in the same manner as described in Example 2, using 0.54 g. of the 57% oil dispersion of sodium hydride and 5.85 g. of the phosphonium salt. To the thus prepared ylid, 5-cyclohexylidenepentan-2-one (1.42 g., 8.6 meq.), prepared as described in Example 2, is added instead of cyclohexanone and the reaction is performed under the same conditions as described for Example 2. Following the deketalization step with hydrochloric acid in THF and subsequent working-up according to the description in Example 2, there is obtained the title product as an oil;

$$\gamma^{CS_2}_{max.} \ 1719 \ cm.^{-1},$$

$\gamma^{CDCl_3}$ 4.93 (brand unresolved multiplet, 2H), 7.4–8.1 (complex absorption, 12H), 7.87 (singlet, 3H, 8.2–8.7 (complex absorption, 9H). The mass spectrum displayed a molecular ion at M/e 234. This product is suitable for the next step, see Example 12.

In one experiment performed according to this procedure the yield was 76% of theory based on 5-cyclohexylidenepentan-2-one.

EXAMPLE 7

10-ethyl-6-methyldodeca-5,9-dien-2-one (IV; R1 and $R^2=C_2H_5$ and $R^3$ and $R^4=CH_3$)

By following the procedure of Example 6 but using an equivalent amount of 6-ethyl-5-octen-2-one, prepared as described in Example 3, instead of 5-cyclohexylidenepentan-2-one, there is obtained the title compound;

$$\gamma^{CS_2}_{max.} \ 1719 \ cm.^{-1},$$

$\gamma^{CDCl_3}$ 4.93 (brand unresolved multiplet, 2H), 7.4–8.2 (complex absorption, 12H), 7.87 (singlet, 3H), 8.3 and 8.4 (two broad singlets, partially superimposed, 3H), 9.03 (triplet, 6H, J = 12 c.p.s.). The mass spectrum displayed a molecular ion at M/e 222.

EXAMPLE 8

In the same manner as described for Example 6, but using an equivalent amount of 5-cyclopentylidenepentan-2-one, 6-ethyl-5-nonen-2-one, 6-ethyl-5-decen-2-one, 6-propyl-5-nonen-2-one, 6-propyl-5-decen-2-one or 6-butyl-5-decen-2-one, prepared as described in Example 4, there may be obtained the dienone derivatives of formula IV, 9-cyclopentylidene-6-methyl-5-nonen - 2 - one, 10-ethyl-6-methyltridecа-5,9-dien-2-one, 10-ethyl-6-methyltetradeca-5,9-dien-2-one, 10-propyl-6-methyltrideca-5,9-dien-2-one, 10-propyl-6-methyltetradeca-5,9-dien-2-one and 10-butyl-6-methyltetradeca-5,9-dien-2-one, respectively.

EXAMPLE 9

In the same manner as described for Example 6, but using an equivalent amount of 6-cyclohexylidenehexan-3-one, 6-cyclopentylidenehexan-3-one, 7-ethyl-6-nonen-3-one, 7-ethyl-6-decen-3-one, 7-ethyl-6-undecen-3-one, 7-propyl-6-decen-3-one, 7-propyl-6-undecen-3one or 7-butyl-6-undecen-3-one, prepared as described in Example 5, instead of 5-cyclohexylidenepentan-2-one, there may be obtained the dienone derivatives of formula IV, 9-cyclohexylidene-6-ethyl - 5-nonen-2-one, 9-cyclopentylidene-6-ethyl-5-nonen-2-one, 6,10-diethyldodeca - 5,9-dien-2-one, 6,10-diethyltrideca-5,9-dien-2-one, 6,10-diethyltetradeca-5, 9-dien-2-one, 6-ethyl-10 - propyltrideca-5,9-dien-2-one, 6-ethyl-10-propyltetradeca-5,9-dien-2-one and 10-butyl-6-ethyltetradeca-5,9-dien-2-one, respectively.

EXAMPLE 10

In the same manner as described for Example 6, but using an equivalent amount of 4-oxohexyl-1-triphenylphosphonium iodide ethylene ketal instead of 4-oxopentyl-1-triphenylphosphonium iodide ethylene ketal and one of the appropriate ketone intermediates of formula III; 5-cyclohexylidenepentan-2-one, described in Example 2; 6-ethyl-5-octen-2-one, described in Example 3; 5-cyclopentylidenepentan-2-one, 6-ethyl-5 - nonen-2-one, 6-ethyl-5-decen-2-one, 6-propyl-5-nonen-2-one, 6-propyl-5-decen-2-one or 6-butyl-5-decen-2-one, prepared as described in Example 4; or 6-cyclohexylidenehexan-3-one, 6-cyclopentylidenehexan-3-one, 7-ethyl-6-nonen-3-one, 7-ethyl-6-decen-3-one, 7-ethyl-6-undecen-3-one, 7-propyl-6-decen-3-one, 7-propyl-6-undecen-3-one or 7-butyl-6-undecen-3-one, prepared as described in Example 5, there may be obtained 10-cyclohexylidene-7-methyl-6-decen-3-one;
11-ethyl-7-methyltrideca-6,10-dien-3-one;
10-cyclopentylidene-7-methyl-6-decen-3-one,
11-ethyl-7-methyltetradeca-6,10-dien-3-one,
11-ethyl-7-methylpentadeca-6,10-dien-3-one,
11-propyl-7-methyltetradeca-6,10-dien-3-one,
11-propyl-7-methylpentadeca-6,10-dien-3-one and
11-butyl-7-methylpentadeca-6,10-dien-3-one;
10-cyclohexylidene-7-ethyl-6-decen-3-one,
10-cyclopentylidene-7-ethyl-6-decen-3-one,
7,11-diethyltrideca-6,10-dien-3-one,
7,11-diethyltetradeca-6,10-dien-3-one,
7,11-diethylpentadeca-6,10-dien-3-one,
7-ethyl-11-propyltetradeca-6,10-dien-3-one,
7-ethyl-11-propylpentadeca-6,10-dien-3-one and
11-butyl-7-ethylpentadeca-6,10-dien-3-one, respectively.

EXAMPLE 11

Dimethylcarbomethoxymethyl phosphonate

Following the general procedure described by P. C. Crofts in Quart. Rev. Chem. Soc., Vol. 12, p. 341 (1958), methyl chloroacetate (1.9 g.) and trimethyl phosphite (16.6 g.) are heated together at 160° C. bath temperature overnight, and the reaction mixture is distilled under reduced pressure to yield the title compound with b.p. 110–135° C./35 mm., $\gamma_{max.}^{CHCl_3}$ 3000, 2900, 1755 cm.$^{-1}$, $\tau^{CDCl_3}$ 6.1, 6.3, 6.8, 7.2. In one experiment carried out according to the above procedure the yield was 42.5 percent of theory.

In the same manner, but using ethyl chloroacetate as starting material, dimethylcarbethoxymethyl phosphonate is obtained.

EXAMPLE 12

Methyl-10-cyclohexylidene - 3,7-dimethyldeca-2,6-dienoate (I, $R^1$ and $R^2$ together=$(CH_2)_5$—, $R^3$, $R^4$ and $R^5$ each=$CH_3$ and $Z^1$ and $Z^2$ together=double bond)

Sodium hydride (1.54 g. of 57% mineral oil dispersion) is washed with pentane (20+10+10 ml.) and benzene (100 ml.) added with stirring. The resulting suspension is cooled to 15° C. and dimethylcarbomethoxymethyl phosphonate (6.21 g., 6×6.1 meq.), prepared as described in Example 11, in benzene (10 ml.) is added dropwise with stirring. When the evolution of hydrogen ceases, 9-cyclohexylidene-6-methyl-5-nonen-2-one (1.43 g., 6.1 meq.), prepared as described in Example 6, is added and the mixture refluxed overnight. After cooling the solution is washed with dilute hydrochloric acid (1N), aqueous sodium bicarbonate (0.05 M), water and then dried over magnesium sulphate and evaporated yielding the title compound as a light yellow oil, which on thin layer chromatography (TLC) showed no appreciable amount of starting ketone of formula IV ($R^1$ and $R^2$=—$(CH_2)_5$—, $R^3$ and $R^4$=$CH_3$).

This oily product was suitable for the next step, see Example 15.

The product may be purified by column chromatography on silica gel. The title compound is characterized by its infrared and its nuclear magnetic resonance spectra and the molecular weight is confirmed by mass spectroscopy;

$\gamma_{max.}^{CS_2}$ 1717 and 1647 cm.$^{-1}$, $\gamma^{CDCl_3}$ 4.31 (singlet, 1H), 4.90 (broad unresolved multiplet, 2H), 6.30 (singlet, 3H), 7.5–8.2 (complex absorption with a prominent double peak at 7.80, 15H), 8.2–8.8 (complex absorption, 9H); M/e 290.

In one experiment performed according to the above procedure yield was 94% of theory based on 9-cyclohexylidene-6-methyl-5-nonen-2-one.

In the same manner, but using dimethylcarboethoxymethyl phosphonate instead of dimethylcarbomethoxymethyl phosphonate, ethyl 10-cyclohexylidene-3,7-dimethyldeca-2,6-dienoate is obtained.

EXAMPLE 13

Methyl 3,7-dimethyl-11 - ethyltrideca - 2,6,10-trienoate (I; $R^1$ and $R^2$=$C_2H_5$, $R^3$, $R^4$ and $R^5$=$CH_3$ and $Z^1$ and $Z^2$ together=double bond)

By following the procedure of Example 13 but using an equivalent amount of 10-ethyl-6-methyldodeca-5,9-dien-2-one, prepared as described in Example 7, instead of 9-cyclohexylidene-6-methyl-5-nonen-2-one, there is obtained the title compound:

$\gamma_{max.}^{CS_2}$ 1717 and 1647 cm.$^{-1}$, $\gamma^{CDCl_3}$ 4.33 (singlet, 1H), 4.91 (broad unresolved multiplet, 2H), 6.33 (singlet, 3H), 7.5–8.2 (complex absorption with a prominent double peak at 7.83 and 7.86, 15H), 8.30 and 8.38 (two broad singlets, 3H), 9.03 (triplet, 6H, J=11 c.p.s.); M/e 278.

In the same manner, but using dimethylcarboethoxymethyl phosphonate instead of dimethylcarbomethoxymethyl phosphonate, ethyl 3,7-dimethyl-11-ethyltrideca-2,6,10-trienoate is obtained.

EXAMPLE 14

In the same manner as described for Example 12, but using an equivalent amount of 9-cyclopentylidene-6-methyl-5-nonen-2-one,
10-ethyl-6-methyltrideca-5,9-dien-2-one,
10-ethyl-6-methyltetradeca-5,9-dien-2-one,
10-propyl-6-methyltrideca-5,9-dien-2-one,
10-propyl-6-methyltetradeca-5,9-dien-2-one and
10-butyl-6-methyltetradeca-5,9-dien-2-one, prepared as described in Example 8;

9-cyclohexylidene-6-ethyl-5-nonen-2-one,
9-cyclopentylidene-6-ethyl-5-nonen-2- one,
6,10-diethyldodeca-5,9-dien-2-one,
6,10-diethyltrideca-5,9-dien-2-one,
6,10-diethyltetradeca-5,9-dien-2-one,
6-ethyl-10-propyltrideca-5,9-dien-2-one,
6-ethyl-10-propyltetradeca-5,9-dien-2-one,
10-butyl-6-ethyltetradeca-5,9-dien-2-one, prepared as described in Examle 9 or 10-cyclohexylidene-7-methyl-6-decen-3-one;
11-ethyl-7-methyltrideca-6,10-dien-3-one;
10-cyclopentylidene-7-methyl-6-decen-3-one;
11-ethyl-7-methyltetradeca-6,10-dien-3-one,
11-ethyl-7-methylpentadeca-6,10-dien-3-one,
11-propyl-7-methyltetradeca-6,10-dien-3-one,
11-propyl-7-methyl-pentadeca-6,10-dien-3-one and
11-butyl-7-methylpentadeca-6,10-dien-3-one;
10-cyclohexylidene-7-ethyl-6-decen-3-one, 10-cyclopentylidene-7-ethyl-6-decen-3-one,
7,11-diethyltrideca-6,10-dien-3-one,
7,11-diethyltetradeca-6,10-dien-3-one,
7,11-diethylpentadeca-6,10-dien-3-one,
7-ethyl-11-propyltetradeca-6,10-dien-3-one,
7-ethyl-11-propyl-pentadeca-6,10-dien-3-one and
11-butyl-7-ethylpentadeca-6,10-dien-3 one, prepared as described in Example 10, instead of 9-cyclohexylidene-6-methyl 5-nonen-2-one and using either dimethylcarbomethoxymethyl phosphonate or dimethylcarboethoxymethyl phosphonate depending on whether the methyl or ethyl ester is desired, there may be obtained the hydrocarbon acid methyl and ethyl esters of formula I, methyl and ethyl 10-cyclopentylidene-3,7-dimethyldeca-2,6-dienoate,
3,7-dimethyl 11-ethyltetradeca-2,6,10-trienoate,
3,7-dimethyl-11-ethylpentadeca-2,6,10-trienoate,
3,7-dimethyl-11-propyltetradeca-2,6,10-trienoate,
3,7-dimethyl-11-propylpentadeca-2,6,10-trienoate,
11-butyl-3,7-dimethylpentadeca-2,6,10-trienoate,
10-cyclohexylidene-7-ethyl-3-methyldeca-2,6-dienoate,
10-cyclopentylidene-7-ethyl-3-methyl-deca-2,6-dienoate,
7,11-diethyl-3-methyltrideca-2,6,10-trienoate,
7,11-diethyl-3-methyltetradeca-2,6,10-trienoate,
7,11-diethyl-3-methylpentadeca-2,6,10-trienoate,
7-ethyl-3-methyl-11-propyltetradeca-2,6,10-trienoate,
7-ethyl-3-methyl-11-propylpentadeca-2,6,10-trienoate,
11-butyl-7-ethyl-3-methylpentadeca-2,6,10-trienoate,
10-cyclopentyliden-3-ethyl-7-methyldeca-2,6-dienoate,
10-cyclopentyliden-3-ethyl-7-methyldeca-2,6-dienoate,
3,11-diethyl-7-methyltrideca-2,6,10-trienoate,
3,11-diethyl-7-methyltetradeca-2,6,10-trienoate,
3,11-diethyl-7-methylpentadeca-2,6,10-trienoate,
3-ethyl-7-methyl-11-propyltetradeca-2,6,10-trienoate,
3-ethyl-7-methyl-11-propylpentadeca-2,6,10-trienoate,
11-butyl 3-ethyl-7-methylpentadeca-2,6,10-trienoate;
10-cyclohexylidene-3,7-diethyldeca-2,6-dienoate,
10-cyclopentylidene-3,7-diethyldeca-2,6-dienoate,
3,7,11-triethyltrideca-2,6,10-trienoate,
3,7,11-triethyltetradeca-2,6,10-trienoate,
3,7,11-triethylpentadeca-2,6,10-trienoate,
3,7-diethyl-11-propyltetradeca-2,6,10-trienoate,
3,7-diethyl-11-propylpentadeca-2,6,10-trienoate and
11-butyl-3,7-diethylpentadeca-2,6,10-trienoate, respectively.

EXAMPLE 15

Methyl 10,11 - epoxy-10-cyclohexyl-3,7-dimethyldeca-2,6-dienoate (I; $R^1$ and $R^2$ together=—$(CH_2)_5$—, $R^2$, $R^4$ and $R^5=CH_3$ and $Z^1$ and $Z^2$ together are an epoxide)

Methyl 10,11 - epoxy-10-cyclohexyl-3,7-dimethyldeca-2,-6-dienoate (252 mg., 0.87 meq.), prepared as described in Example 12, is dissolved in 15 ml. of dimethoxyethane and 10 ml. of water. N-Bromosuccinimide (170 mg., 0.96 meq.) is added and the mixture stirred for 1 hour. Extraction with ether (3× 10 ml.), followed by washing with dilute hydrochloric acid (5 ml. of 1%), water (2× 5 ml.), drying over magnesium sulfate and evaporation affords a clear yellow oil.

This crude product is dissolved in absolute methanol (15 ml.), cooled to 0° C. and treated with sodium methoxide (72 mg.). After stirring at 0° C. for ½ hour the solvent is evaporated under reduced pressure, water (10 ml.) and ether (10 ml.) added, the ethereal layer decanted and the aqueous layer extracted with ether (10 ml.). The joined ethereal extracts are washed with water, dried over magnesium sulfate, and the solvent evaporated to yield an oil which was subjected to preparative TLC on silica gel developing with chloroform. Elution of zones gives the title compound and starting triene ester, methyl 10-cyclohexylidene-3,7-dimethyldeca - 2,6 - dienoate. The title compound is characterized by its infrared and nuclear magnetic resonance spectra, and the molecular weight of the product is confirmed by mass spectroscopy:

$\gamma_{max.}^{CS_2}$ 1717 and 1647 cm.$^{-1}$, $\tau^{CDCl_3}$ 4. 30(singlet, 1H),
4.83 (unresolved multiplet, 1H), 6.30 (singlet, 3H), 7.31 (triplet, J=c.p.s.), 7.6–8.1 (complex absorption with two very close singlets at 7.83 and 7.86 (9H), 8.2–8.8 (complex absorption, 15H); M/e 306.

In one experiment performed according to this procedure the yield was 43% of theory based on the starting triene ester and 20% of the starting triene ester was recovered.

Alternatively, methyl 10-cyclohexylidene-3,7-dimethyldeca-2,6-dienoate (252 mg., 0.87 meq.) is dissolved in 40 ml. of ether and cooled to 0° C. m-Chloroperbenzoic acid (166 mg. 0.96 meq.) in 20 ml. of ether is added and the solution mixed and the allowed to stand at 0° C. for 16 hours. The mixture is diluted with water and extracted with ether. The ether extract is washed with 5% sodium bicarbonate, dried over magnesium sulfate and evaporated to yield the crude title compound as an oil. Purification is effected as described above.

In the same manner, but using an equivalent amount of ethyl 10 - cyclohexylidene - 3,7 - dimethyldeca - 2,6- dienoate instead of methyl 10 - cyclohexylidene - 3,7 - dimethyldeca - 2,6 - dienoate, ethyl 10,11 - epoxy - 10 - cyclohexyl-3,7-dimethyldeca-2,6-dienoate may be obtained.

EXAMPLE 16

Methyl 10,11 - epoxy - 3,7 - dimethyl-11-ethyltrideca-2,6-dienoate (I, $R^1$ and $R^2=C_2H_5$, $R^3$, $R^4$ and $R^5=CH_3$ and $Z^1$ and $Z^2$ together are an epoxide)

By following the procedure of Example 15 but using an equivalent amount of methyl 3,7-dimethyl-11-ethyltrideca-2,6,10-trienoate, prepared as described in Example 13, instead of methyl 10-cyclohexylidene-3,7-dimethyldeca-2,6-dienoate, there is obtained the title compound $\gamma_{max.}^{CS_2}$ 1717 and 1647 cm.$^{-1}$; $\tau^{CDCl_3}$ 4. 33 (singlet, 1H), 4.86 (unresolved multiplet, 1H), 6.30 (singlet, 3H), 7.30 (triplet, J=9 c.p.s., 1H), 7.81 and 7.84 (two singlets superimposed to a broad band, 9H), 8.30/8.37 (central peaks of a broad unresolved multiplet, 6H), 8.48/8.60 (broad singlets, 3H), 8.87–9.30 (complex absorption, 6H); M/e 294.

In the same manner but using an equivalent amount of ethyl 3,7-dimethyl 11-ethyltrideca-2,6,10-trienoate instead of the corresponding methyl ester described above, ethyl 10,11-epoxy-3,7-dimethyl - 11 - ethyltrideca - 2,6 - dienoate may be obtained.

EXAMPLE 17

In the same manner as described for Example 15, but using an equivalent amount of the products, the hydrocarbon acid esters of Formula I, listed respectively in Example 14, instead of methyl 10-cyclohexylidene-3,7-dimethyldeca-2,6-dienoate, there may be obtained the corresponding hydrocarbon acid methyl and ethyl esters of Formula I, listed respectively below, in which $Z^1$ and $Z^2$ together represent a 10,11-epoxide:

Methyl and ethyl 10,11 - epoxy - 10 - cyclopentyl-3,7-dimethyldeca-2,6-dienoate,
10,11-Epoxy-3,7-dimethyl-11-ethyltetradeca-2,6-dienoate,
10,11-Epoxy-3,7-dimethyl-11-ethylpentadeca-2,6-dienoate,
10,11-Epoxy-3,7-dimethyl-11-propyltetradeca-2,6-dienoate,
10,11-Epoxy-3,7-dimethyl-11-propylpentadeca-2,6-dienoate,
10,11-Epoxy-11-butyl-3,7-dimethylpentadeca-2,6-dienoate,
10,11-Epoxy-10-cyclohexyl-7-ethyl-3-methyldeca-2,6-dienoate,
10,11-Epoxy-10-cyclopentyl-7-ethyl-3-methyldeca-2,6-dienoate, 10,11-Epoxy-7,11-diethyl-3-methyltrideca-2,6-dienoate,
10,11-Epoxy-7,11-diethyl-3-methyltetradeca-2,6-dienoate,
10,11-Epoxy-7,11-diethyl-3-methyl pentadeca-2,6-dienoate,
10,11-Epoxy-7-ethyl-3-methyl-11-propyltetradeca-2,6-dienoate,
10,11-Epoxy-7-ethyl-3-methyl-11-propylpentadeca-2,6-dienoate,
10,11-Epoxy-11-butyl-7-ethyl-3-methylpentadeca-2,6-dienoate,
10,11-Epoxy-10-cyclohexyl-3-ethyl-7-methyldeca-2,6-dienoate,
10,11-Epoxy-10-cyclopentyl-3-ethyl-7-methyldeca-2,6-dienoate,
10,11-Epoxy-3,11-diethyl-7-methyltrideca-2,6-dienoate,
10,11-Epoxy-3,11-diethyl-7-methyltetradeca-2,6-dienoate,
10,11-Epoxy-3,11-diethyl-7-methylpentadeca-2,6-dienoate,
10,11-Epoxy-3-ethyl-7-methyl-11-propyltetradeca-2,6,-dienoate,
10,11-Epoxy-3-ethyl-7-methyl-11-propylpentadeca-2,6-dienoate,
10,11-Epoxy-11-butyl-3-ethyl-7-methylpentadeca-2,6-dienoate,
10,11-Epoxy-10-cyclohexyl-3,7-diethyldeca-2,6-dienoate,
10,11-Epoxy-10-cyclopentyl-3,7-diethyldeca-2,6-dienoate,
10,11-Epoxy-3,7,11-triethyltrideca-2,6-dienoate,
10,11-Epoxy-3,7,11-triethyltetradeca-2,6-dienoate,
10,11-Epoxy-3,7,11-triethylpentadeca-2,6-dienoate,
10,11-Epoxy-3,7-diethyl-11-propyltetradeca-2,6-dienoate,
10,11-Epoxy-3,7-diethyl-11-propylpentadeca-2,6-dienoate and,
10,11-Epoxy-11-butyl-3,7-diethylpentadeca-2,6-dienoate.

The embodiments of the invention in which an exclusive property or privilege is claimed are defined as follows:

1. Compounds of the formula

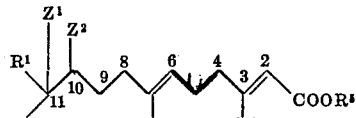

in which $R^1$ and $R^2$ together are a polymethylene radical containing 4–5 carbon atoms which in conjunction with the carbon atom to which they are joined form a cyclopentane or cyclohexane ring, each of $R^3$, $R^4$ and $R^5$ is an alkyl group containing 1–2 carbon atoms and $Z^1$ and $Z^2$ together are a carbon-carbon double bond between carbon atoms 10 and 11.

2. A compound as claimed in Claim 1 which is methyl 10-cyclohexylidene-3,7-dimethyldeca-2,6-dienoate.

References Cited
UNITED STATES PATENTS

| | | | |
|---|---|---|---|
| 2,781,387 | 2/1957 | Surmatis | 260—410.9 R |
| 3,671,558 | 6/1972 | Siddall et al. | 260—410.9 R |

LEWIS GOTTS, Primary Examiner

D. G. RIVERS, Assistant Examiner

U.S. Cl. X.R.

260—340.9, 586 R, 593 H; 424—312

PO-1050
(5/69)

UNITED STATES PATENT OFFICE
CERTIFICATE OF CORRECTION

Patent No. 3,845,088　　　　　　　　　Dated Oct. 29, 1974

Inventor(s) John A. Findlay

It is certified that error appears in the above-identified patent and that said Letters Patent are hereby corrected as shown below:

Column 1, line 10, after "Serial No. 357,978"

insert --claims priority, Application Canada, October 13, 1970,

Serial No. 95,437.--

Signed and sealed this 29th day of April 1975.

(SEAL)
Attest:

RUTH C. MASON
Attesting Officer

C. MARSHALL DANN
Commissioner of Patents
and Trademarks